(12) United States Patent
Kalkbrenner et al.

(10) Patent No.: US 9,097,889 B2
(45) Date of Patent: Aug. 4, 2015

(54) MICROSCOPE AND METHOD FOR DETECTING SAMPLE LIGHT

(75) Inventors: Thomas Kalkbrenner, Jena (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 282 days.

(21) Appl. No.: 13/637,122

(22) PCT Filed: Mar. 17, 2011

(86) PCT No.: PCT/EP2011/001320
§ 371 (c)(1),
(2), (4) Date: Sep. 25, 2012

(87) PCT Pub. No.: WO2011/116901
PCT Pub. Date: Sep. 29, 2011

(65) Prior Publication Data
US 2013/0020473 A1    Jan. 24, 2013

(30) Foreign Application Priority Data

Mar. 26, 2010 (DE) .......................... 10 2010 013 829

(51) Int. Cl.
G02B 21/00 (2006.01)
G02B 26/06 (2006.01)

(52) U.S. Cl.
CPC ........ G02B 21/0056 (2013.01); G02B 21/0032 (2013.01); G02B 21/0076 (2013.01); G02B 26/06 (2013.01)

(58) Field of Classification Search
CPC ........... G02B 21/0056; G02B 21/0032; G02B 21/0076; G02B 26/06
USPC ................... 359/279, 385; 250/216
See application file for complete search history.

(56) References Cited

U.S. PATENT DOCUMENTS 6,028,306 A    2/2000 Hayashi
6,219,179 B1   4/2001 Nielsen et al.
(Continued)

FOREIGN PATENT DOCUMENTS

DE    199 04 592 C2    3/2001
EP    0 500 717 B2     11/2003
(Continued)

OTHER PUBLICATIONS

Corle, T.R., et al.; "Electrooptic phase sensitive confocal scanning optical microscope"; Conference on Lasers and Electro Optics, Apr. 25-29, 1988; XP 000092275.
(Continued)

*Primary Examiner* — Frank Font
(74) *Attorney, Agent, or Firm* — Duane Morris LLP

(57) ABSTRACT

Microscope and method for detecting sample light, having at least one illuminating beam which is partially phase-modulated with a modulation frequency along the cross section thereof and a microscope objective for intensity-modulated focusing of the illuminating beam into a sample. The microscope has a detection beam path that has at least one demodulator. At least one electro-optical modulator (EOM) is used for phase modulation of at least a part, preferably half, of the illuminating beam, or different portions or halves of the illuminating beam are modulated differently, preferably anti-phase, by anti-phase control of piezoelectric elements, or acousto-optical modulators for splitting into a plurality of partial beam paths. Optic elements are provided for partial phase modulation of the excitation beam. Actuating elements are provided for setting the phase difference, or at least one optic modulator, preferably an acousto-optical modulator (AOM) is used for demodulation in the detection, or a change in the mode of operation of the detectors for demodulation takes place. In the case of foci distribution, produced for example by a spinning micro-lens disc or multi-spot generation, the individual foci are subjected to an intensity modulation, either by arranging a half-space phase mask in a pupil plane of the objective or by individually manipulating each partial beam by means of the partial phase modulation of said partial beam with a modulation frequency along the cross section thereof or by manipulating a beam by means of the partial phase modulation of said beam with a modulation frequency along the cross section thereof and subsequent subdivision of said beam.

19 Claims, 6 Drawing Sheets

(56) References Cited

U.S. PATENT DOCUMENTS

| | | | | |
|---|---|---|---|---|
| 6,642,504 | B2* | 11/2003 | Cathey, Jr. | 250/216 |
| 7,364,296 | B2* | 4/2008 | Miller et al. | 351/206 |
| 7,400,446 | B2* | 7/2008 | Mikuriya et al. | 359/385 |
| 7,738,115 | B2* | 6/2010 | Ocelic et al. | 356/501 |
| 8,585,587 | B2* | 11/2013 | French et al. | 600/181 |
| 2010/0067103 | A1* | 3/2010 | Sangu | 359/385 |

FOREIGN PATENT DOCUMENTS

| | | |
|---|---|---|
| EP | 2 163 935 A1 | 3/2010 |
| WO | WO 2009/008838 A1 | 1/2009 |

OTHER PUBLICATIONS

Chen, N.G., et al.; "Real time focal modulation microscopy"; Proceedings of SPIE (2010); 7570:75700Q-1 to 75700Q-6.

Chen, Nanguang, et al.; "Focal modulation microscopy"; Optics Express (2008); 16(23):18764-18769.

Wong, Chee Howe, et al.; "Simple spatial phase modulator for focal modulation microscopy"; Applied Optics Jun. 2009; 48(17):3237-3242.

Confocal Scanner Unit—Yokogawa Global; http://www.yokogawa.com.

Dissertation R. Lange; Universitat Siegen (2000).

SwissRanger SR4000 Overview; http://www.mesa-imaging.ch.

Gated-Intensifier-Kamera:z.B tautec pico star; http://www.tautec.com/4709/4736.html.

Gong, Wei, et al.; "Improved spatial resolution in fluorescence focal modulation microscopy"; Optics Letters 2009; 34(22): 3508-3510.

English language translation of the International Preliminary Report on Patentability and Written Opinion of the International Searching Authority.

* cited by examiner

MICROSCOPE AND METHOD FOR DETECTING SAMPLE LIGHT

RELATED APPLICATIONS

The present application is a U.S. National Stage application of International PCT Application No. PCT/EP2011/001320 filed on Mar. 17, 2011 which claims priority benefit of German Application No. DE 10 2010 013 829.0 filed on Mar. 26, 2010, the contents of each are incorporated by reference in their entirety.

BACKGROUND OF THE INVENTION

The invention relates to microscopy for optical examination, in particular in highly scattering media with limited depth of penetration, in particular biological samples.

REFERENCES

[1] Chen et al., Opt. Express 16, 18764 (2008)
[2] Wong et al., Appl. Opt. 48, 3237 (2009)
[3] http://www.yokogawa.com/scanneriproducts/csu.X1e_1.htm
[4] Dissertation R. Lange, Universität Siegen (2000)
[5] TOF Kamera mit Lock-In pixeln: http://www.mesa-imaging.ch/
[6] Gated-Intensifier-Kamera: z.B. tautec pico star: http://www.tautec.com/4709/4736.html The foregoing references are discussed in the text below.

Various methods are known to limit interference with the detection signal by sample scattering. One such method is Multiphoton microscopy (EP500717 B2). In this application pulsed laser beams are used to excite multiple photons. The lasers used are very expensive. There are application restrictions in this method. For example, these include the selection of dyes and high sample load.

Focal modulation microscopy (FMM) is another method to limit interference, as published, for example, in above references [1] and [2]:

In FMM, half of the excitation laser beam (in diameter) is phase modulated. This semi-lateral phase modulation results in intensity modulation in the focal volume when focused through the objective of a microscope. This intensity modulation can be detected after the confocal pinhole array, for example, by lock-in detection. The advantage of this method is that only the ballistic, i.e. unscattered, photons contribute to this modulation signal; multiply scattered photons in highly scattering media lose the fixed phase relationship. Accordingly, scattered photons do not contribute to the lock-in demodulated signal, which strongly reduces the scattered light background (both in excitation and detection) and increases the penetration depth of a confocal laser scanning microscope.

Hitherto, mechanical approaches have been used for phase modulating half the laser beam. In reference [1], the laser beam is directed onto a divided mirror, one half of which is moved relative to the other half using a piezo element.

In reference [2], half of the beam is guided through a glass plate that is located on a galvanometer seamier. The phase of the one beam half is modulated relative to the other by rotating this plate.

The basic problem of all mechanical approaches (other than adjustment, etc.) is the low modulation rate that is limited by the mechanical resonance frequency of the actuators used (5-20 kHz for references [1] and [2]). Since the lock-in detection method requires a minimum number of modulation periods per pixel dwell time (5-10 minimum), the image recording rate is severely limited.

SUMMARY OF THE INVENTION

It is an object of the invention to avoid the disadvantages of the prior art.

This object is achieved by the methods and microscopes according to the annexed claims.

Electro-Optical Modulator (EOM):

According to the invention, EOMs are used for particularly fast, non-mechanical phase modulation of at least a portion, preferably half, of the excitation beam.

A portion of the excitation beam may run via the EOM, or the EOM may be modulated in a section in which the excitation beam runs.

Of particular advantage, different beam sections or halves are modulated differently (anti-phase) by opposite-poled triggering of parts of an EOM or by several EOMs.

Electro-optical modulators utilize the Pockels effect in a birefringent crystal where the polarization or phase of the laser light is changed by applying a voltage. Depending on the type and size of the crystal, this process may be very fast (up to several 10 MHz).

The embodiments described below show how this can be favorably utilized for FMM microscopy: (a) EOM crystal with respective beam widening and collimated laser beam half illuminated (FIG. 1a)); (b) EOM crystal in which the alternating electrical field is defined by the electrodes only across the half beam (FIG. 1b)); (c) EOM with opposing fields (optionally in sequential arrangement) to minimize stray fields (FIG. 1c)); (d) Classical EOM in connection with polarizer before and after the beam, wherein only half the beam runs through the polarizers; thus, the intensity of the half beam is modulated directly, which similarly leads to intensity modulation at the focus.

A fundamental important advantage of all EOM-based solutions is the greatest possible modulation rate of several 10's of MHz.

BRIEF DESCRIPTION OF THE DRAWINGS

The invention will be described in connection with the following annexed drawings.

FIGS. 1 a)-c) show top views of the EOM plane with the laser beam L shown hatched.

DESCRIPTION OF EMBODIMENTS

Figure 1:
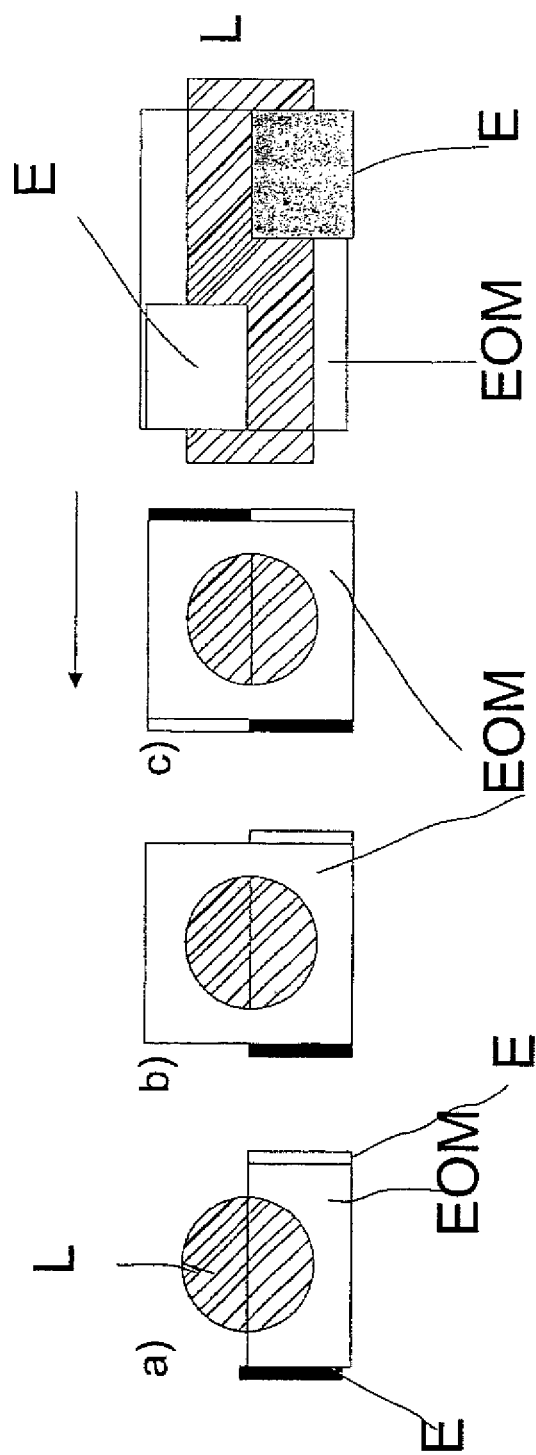
FIG. 1 shows the phase modulation of a portion, especially of half the laser beam, using an electro-optical modulator (EOM).

In accordance with references [1] and [2], the EOM is in the illumination beam path, in a widened (collimated) section of the beam.

The magnitude of the beam widening can be used to adjust the beam cross section to the crystal size.

In FIG. 1a), the modulation space is defined by the EOM through illumination of the crystal with half of the laser beam L. The crystal has lateral electrodes for high-frequency triggering.

In FIG. 1b, the modulation space is defined by the electrodes of the EOM in that the electrodes trigger only that half of the EOM that is located above the lower half of the beam, therefore the entire crystal is illuminated, but only half of the beam is modulated (by the position of the electrodes).

In FIG. 1c, two upper and lower beam halves are modulated differently using two electrodes with opposing polarity in the upper and lower parts. The modulated sections may, but do not have to be arranged one above the other on the laser beam. The right part of FIG. 1c) is a schematic lateral view (in the direction of the arrow in the left part) m in which the triggered sections are laterally offset from one another.

This may be advantageous for preventing stray fields (EOMs require high voltages).

An embodiment with anti-phase polarization may be advantageous, for example, when the crystal should not be modified but crosstalk effects from one side to the other are avoided. Anti-phase control also doubles the stroke distance (distance of the opposing amplitudes) compared to single-phase control; for a desired phase difference (stroke), the crystal could also be shortened (shortened run length). The offset arrangement of the triggered regions of the EOM also allows an overlap of the two beam areas (beyond half).

It is interesting that anti-phase control is also an advantageous development of Chen [1]—a second piezo drive could be installed for the second beam half, wherein both piezo drives could be operated at opposite phases.

An effect of offset along the beam as shown in FIG. 1c) is possible in Chen [1].

Application of acousto-optical modulators (AOMs) in FMM:

According to the invention, acousto-optical modulators are used in order to modulate the excitation beam in interaction with a splitting together with elements that split the beam into several partial beam paths and with optical elements for partial phase modulation of the excitation beam and advantageously with actuators for setting the phase difference.

Acousto-optical modulators use the diffraction of the laser beam at a standing sound wave in a crystal for fast deflection or switching of a laser. This effect can be used as follows for fast phase modulation of half the laser beam if the deflection of the beam is used accordingly:

AOM switches fast between partial beam paths with half fixed phase shift each (e.g. through half the glass plate), see FIG. 2a).

AOM switches fast between partial beam paths that are recombined using a special beam combiner in which one semicircle is designed as a mirror and the complementary semicircle is designed as an aperture (see FIG. 2b).

For example, the phase shift can be set by changing the optical path length using a piezo actuator at one of the deflecting mirrors and thus be adapted to different wavelengths.

AOMs do not switch as fast as EOMs (due to the speed of acoustic propagation in the crystal) but they are more cost-effective. At 1-10 MHz, the potential switching rates are still clearly higher than any rates that can be achieved using mechanical or electromechanical elements.

Figure 2:
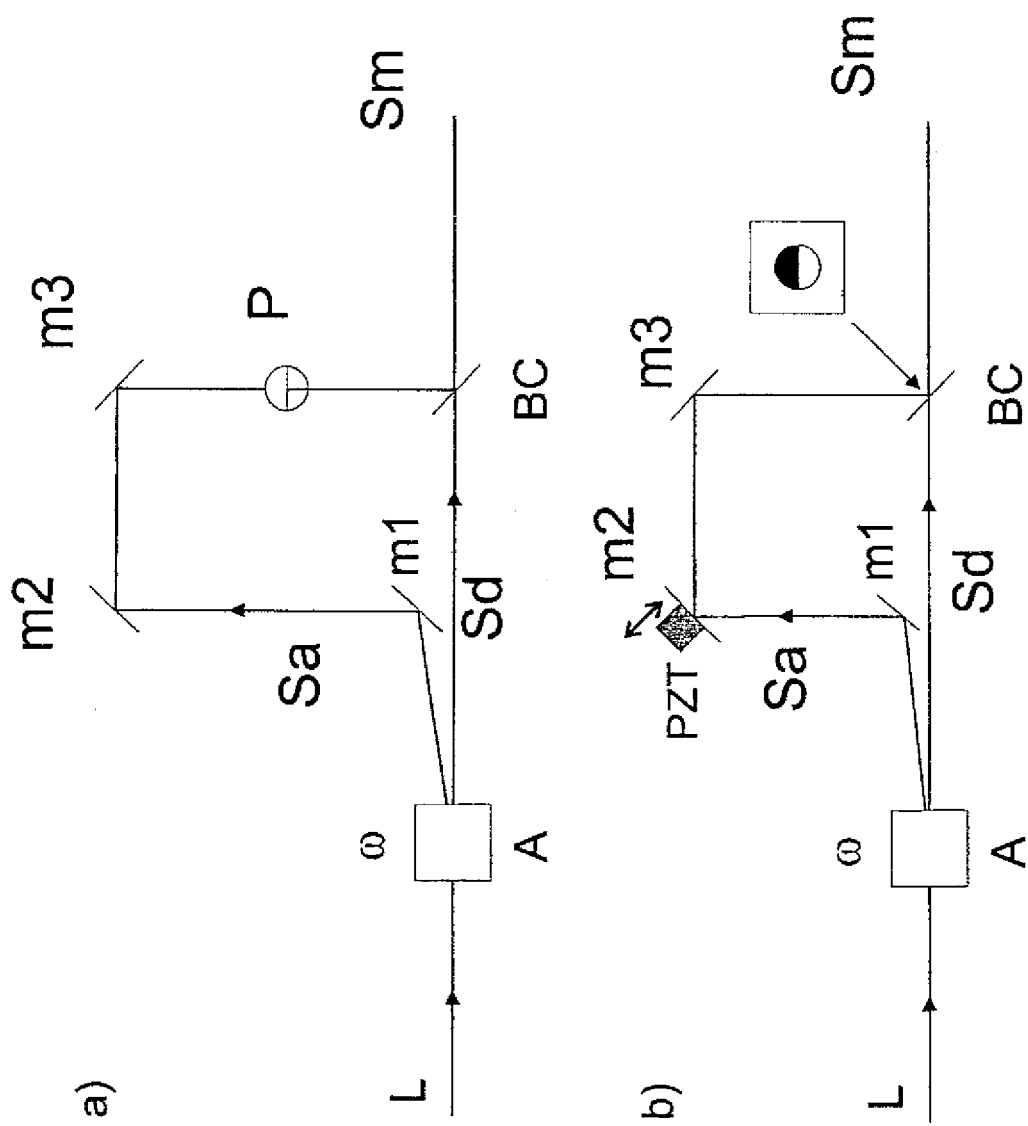
FIG. 2 shows the fast phase modulation of half the laser beam L using an AOM.

FIG. 2 shows the fast phase modulation of half the laser beam L using an AOM (A).

In FIG. 2a), switching takes place between two beam paths, wherein the upper half is guided through a glass plate. The beam paths are recombined at the beam combiner (BC).

FIG. 2b) is similar to FIG. 2a) but half a mirrored aperture mask is used as the beam combiner (white=mirrored, black=aperture).

Both parts of FIG. 2 show a laser beam in the region of illumination of the microscope, an acousto-optical element A, such as an AOM, and deflecting mirrors m1, m2, m3, beam combiner BC, a piezo actuator PZT, and a semicircular glass plate P.

A is an acousto-optical deflector that switches a beam at a frequency ω between two angular directions in which a through beam Sd and a deflected beam Sa run, wherein Sa is guided on a deflected route via mirrors m1, m2, m3.

The plate P in 2a) is a semicircular glass plate used to phase modulate half the full beam Sa of the deflected route on half, while the through beam is not phase modulated; the two beams are superimposed again at BC where they obtain a half modulated beam Sm. The absolute phase of the upper deflected beam can be set using a mirror mounted on a piezo actuator (PZT) (slow, DC). The AOM performs fast modulation by switching between the beam paths.

The piezo element PZT in FIG. 2b) can also be a mirror with a mechanical actuator as indicated by the arrow in FIG. 2a), to adjust the path difference. The AOM switches between the two beams at the frequency ω, thereby switching half-beam phase modulation on and off, which results in the intensity modulation according to the invention at the focus. This intensity modulation, while periodically rising and falling, is not necessarily a pure sine function. It could be rectangular, for example, which would have to be taken into account in demodulation (higher harmonic components). For a sine function approximated by the AOM, the angle of deflection between through beam and deflected beam would be slightly varied by the AOM on M1.

In 2b), no phase plate is provided in Sa but instead at BC there is a semicircular, reflective part and an open semicircle (half aperture plate); i.e., the reflective portion is effectively phase-shifted by the length difference of the beam paths (adjustable by the actuator PCT) and after BC, the beam Sm has two phase-shifted halves that are superimposed at the focus.

The modulation methods described herein can be used directly together with a fast lock-in amplifier for FMM microscopy as described in above cited references [1] and [2].

But they are also suitable for detection methods described below with reference to FIG. 3, which circumvent the use of an expensive lock-in amplifier.

These methods can also be used for multi-spot scanning electron microscopes if the modulator is placed in the pupil or a conjugated plane.

Embodiments in the detection part of an FMM arrangement:

Optical modulators are used, according to the invention, for demodulation in detection, or the operational principle of the detectors is used for demodulation.

Figure 3:
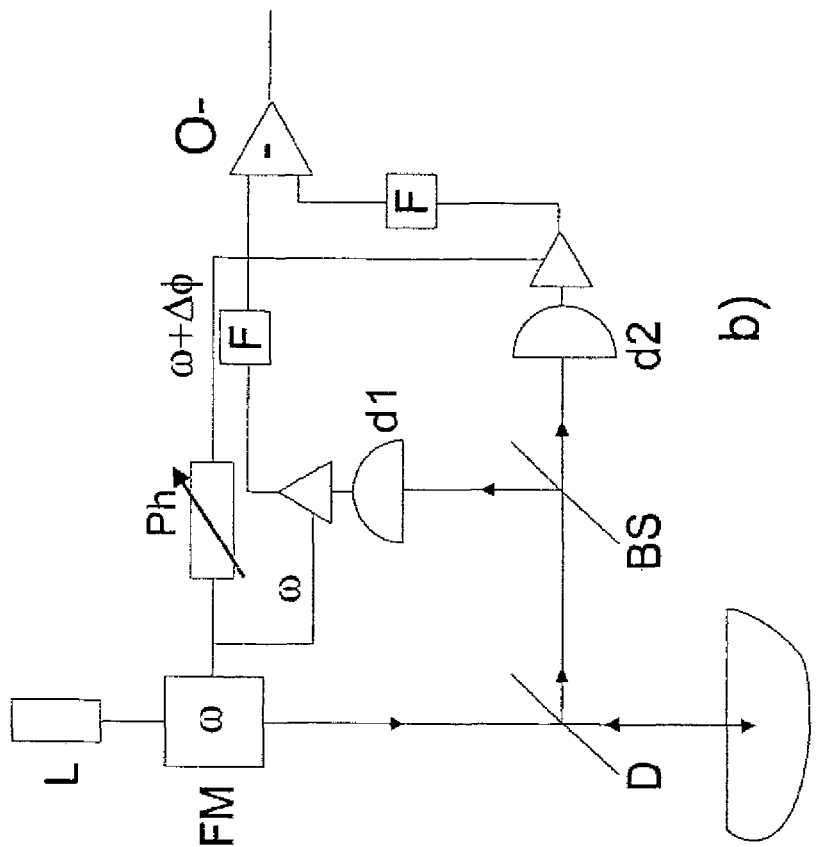
FIG. 3 shows a microscope setup for increasing penetration depth/scattered light suppression.
Figure 3:
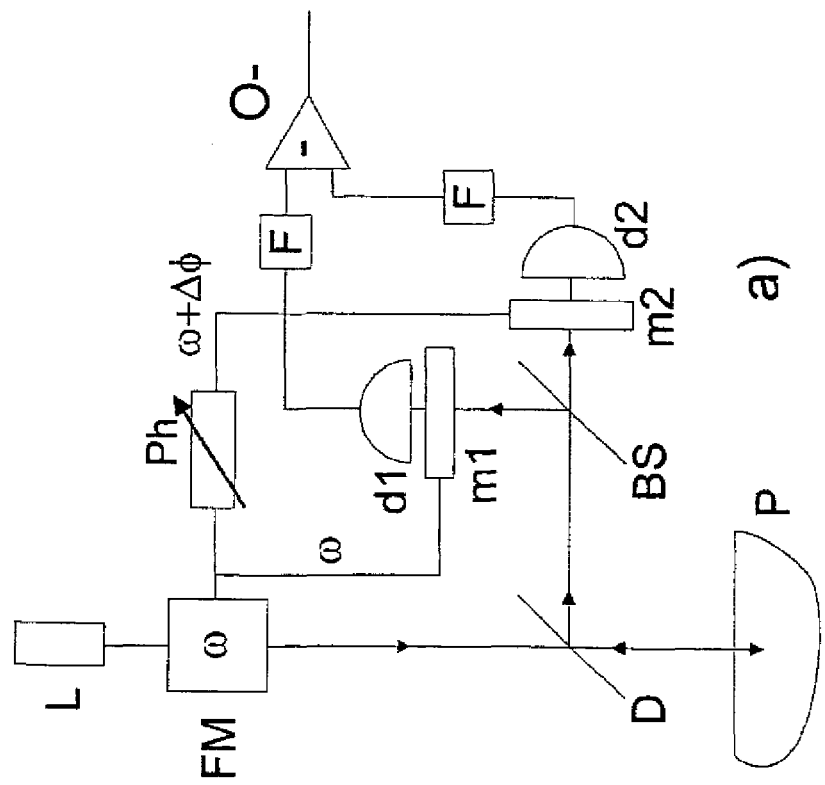

FIG. 3 shows a microscope setup for increasing penetration depth/scattered light suppression, wherein a dichroic splitter mirror D for separating the illumination and detection beam paths is provided in the schematic beam path of a laser beam L in the direction of a sample P. A beam splitter BS splits the detection into two partial beam paths in which detectors d1, d2 are located:

The figure further shows optical modulators m1, m2, an element Ph for phasing, a filter F, a focus modulator FM, and a subtraction operator O−.

The laser L for fluorescence beam excitation is modulated at a frequency ω using a focus modulator (FM) as shown, for example, in FIGS. 1 and 2.

The fluorescence radiation of the sample (P) that is reflected from the dichroic (D) and now also modulated by ω is phase-sensitively detected by two detectors d1 and d2 via a 50/50 beam splitter (BS). Another modulator m may be inserted upstream of d1 and d2, respectively (m1, m2 in FIG. 3a) for this purpose, or the detector gain of d1 and d2 is modulated (FIG. 3b).

The smoothed-out signals (filter F, e.g. integrator) are then subtracted from one another (operator O−).

The modulators m1, m2 may be optical modulators such as EOMs.

M1 is directly modulated and m2 is subjected to a phase shift using Ph; therefore, two partial signals that comprise a phase difference (delta phi) between one another are detected, mixed, and filtered using a low-pass filter; so optical demodulation with a set relative phase, ideally 90 degrees between the two detection components, is performed to subtract the states with an intact focus from the shifted states in which the focus is disturbed through destructive interference (—Operator). In this way, the out-of-focus background (scattered light) is subtracted from the signal from the focus on each pixel.

In FIG. 3b, it is not the optical signal but the gain of the detectors (e.g. the accelerating voltage of a PMT) that is modulated, triggered via FM, and the phase once again is set via Ph, the signals are filtered through F and subtracted using O−.

The detectors d1 and d2 can be switched on and off at the frequency ω (and set phase shift), for example.

Figure 4:
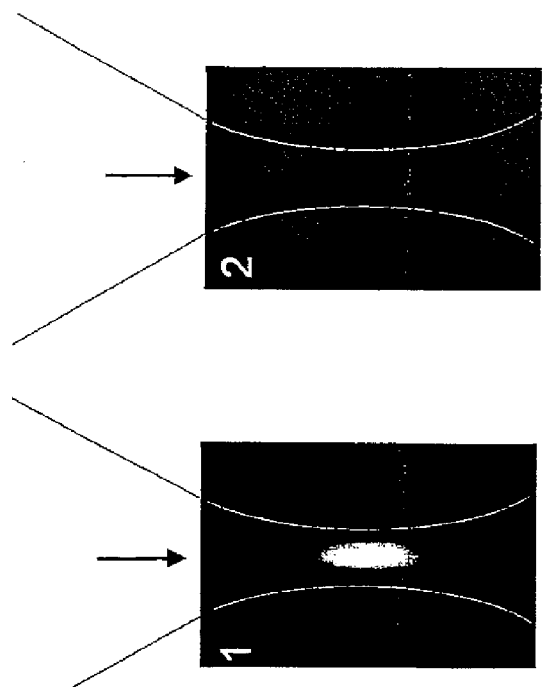
FIG. 4 illustrates signal detection.
Figure 4:
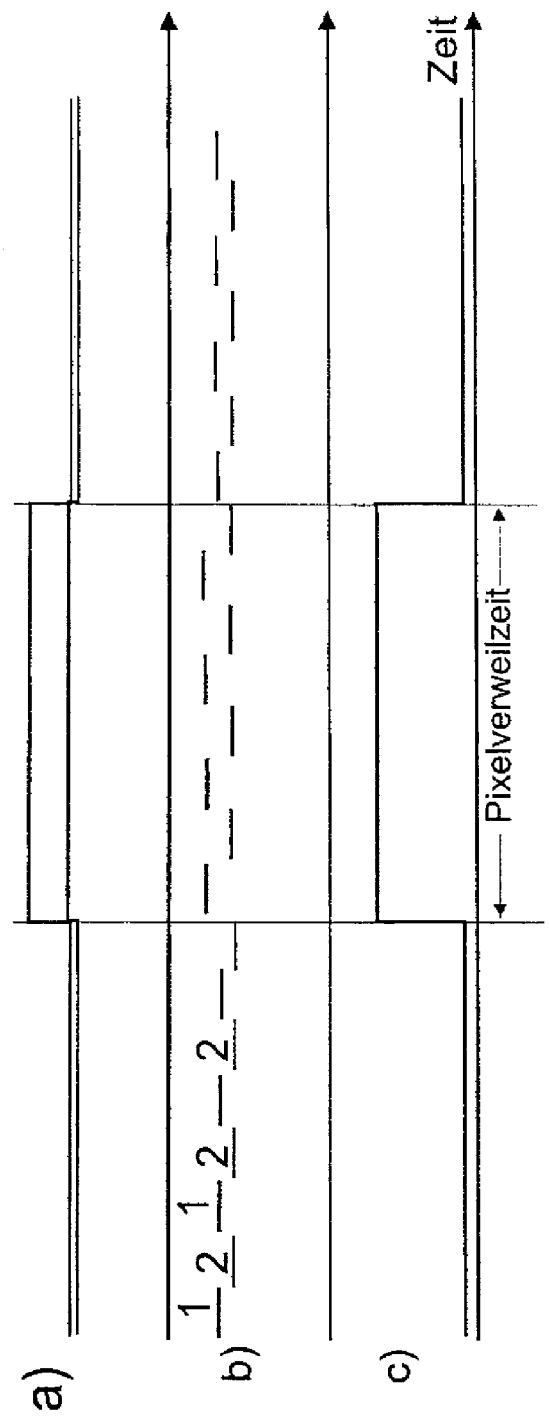

FIG. 4 illustrates signal detection.

The top portion of FIG. 4 shows fluorescence excitation in the focus area with the beam halves in phase (1) and phase shifted by 180 degrees (see Gong et al., Optics Letters 34, 3508 (2009)). The signals are illustrated in the bottom portion.

In FIG. 4, a) is an assumed signal of a classic confocal microscope in a highly scattering medium across 3 pixels. The signal from the focus is barely above the background that is produced by the path of the excitation signal through the sample.

In FIG. 4, b) is the corresponding signal using a phase modulator as, for example, in FIG. 2. Fast switching between states 1) and 2) shown above takes place. Since the excitation beam is phase modulated and this modulation transforms into intensity modulation at the focus only, the strong background contribution made by the beam path through the sample is substantially the same for both states 1) and 2).

In-phase subtraction of the two signals in accordance with FIG. 3 can therefore eliminate the entire background contribution, and the useful signal shown in c) remains.

Figure 5:
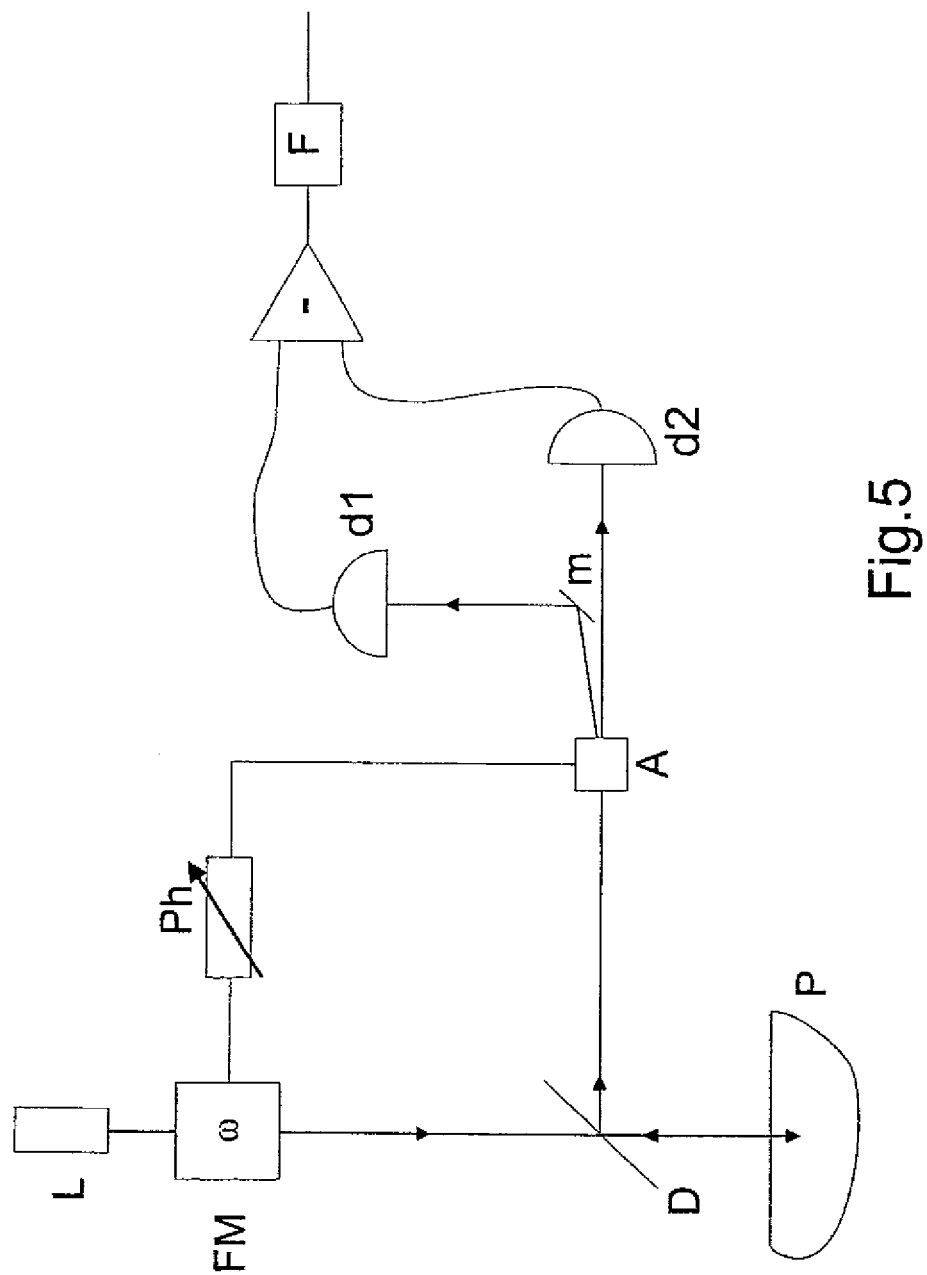
FIG. 5 shows a beam path similar to that shown in FIG. 3.

Optical modulation in the detection beam path:

According to the invention, beam switching by AOM is used for demodulation. FIG. 5 shows a beam path similar to that shown in FIG. 3.

But here, switching between detectors d1 and d2 takes place, preferably by an AOM (A), similar to FIG. 2, but in the detection beam path.

Once again, and as shown and explained above, the in-focus and out-of-focus signals are subtracted and sent through a low-pass filter.

Since no beam splitter is used, there is no loss of half the signal intensity.

The phase difference can be set using Ph.

Wide-field microscope with background suppression

Surprisingly, and according to the invention, the individual foci of a foci distribution, produced, for example, by a spinning micro-lens disc or multi-spot generation as described in U.S. Pat. No. 6,028,306, which is made an integral part of the disclosure of this patent application, are subjected to an intensity modulation according to the FMM method, either jointly or by arranging a half-space phase mask according to the FMM method, especially as described above, in a pupil plane of the objective or by individually manipulating each partial beam using the FMM method, or by jointly manipulating a beam and subsequent splitting of said beam as described in DE 199 04 592 C2, U.S. Pat. No. 6,219,179.

The modulation and demodulation methods described above for a point-scanning system can be applied to a wide-field fluorescent image, for example, as described below.

A microscope setup as shown schematically in FIG. 5 can be used for this purpose.

Figure 6:
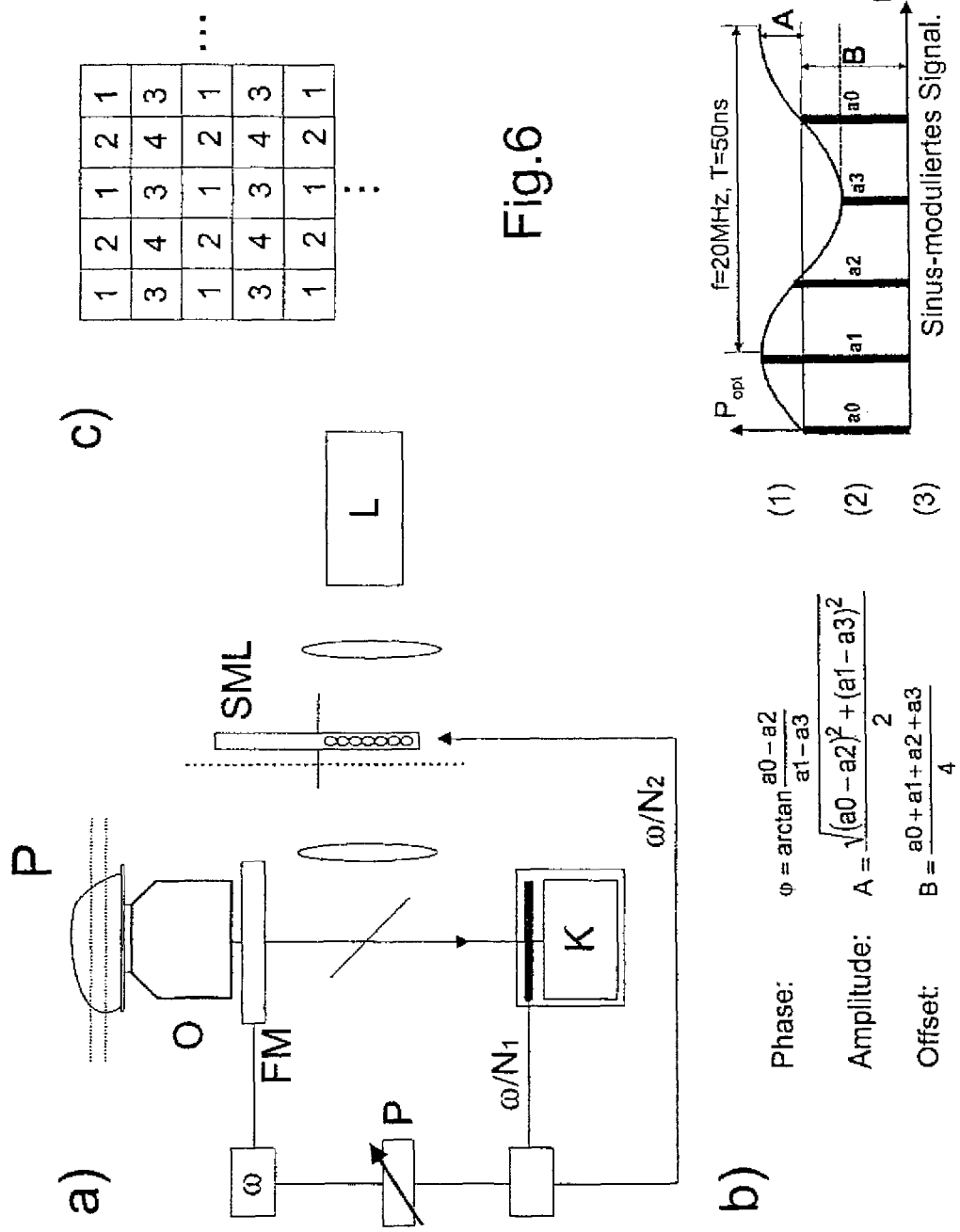
FIG. 6 shows a wide-field FMM microscope with a rotating micro-lens disc.

FIG. 6 shows a wide-field FMM microscope with a rotating micro-lens disc (SML) in the intermediate image, a focus modulator (FM) in the pupil of the microscope objective O, and a camera (K) with a trigger-ready image intensifier.

FIG. 6b) shows an example of discrete demodulation with 4 partial images (from above reference [4]). FIG. 6c) illustrates an example of the modulation and pixel frequencies.

A spinning micro-lens disc such as in a Yokogawa wide-field scanning module (see above reference [3]) is brought into the vicinity of an intermediate image plane such that the foci of the micro-lenses are projected through the objective into the sample. Each of these foci now has to be intensity-modulated as described above or in references [1] and [2]. To achieve this, a modulator can be brought into the pupil of the illumination beam path as described above. The phase modulation that takes place there subjects all foci to a corresponding intensity modulation in the sample.

Wide-field detection must be performed in-phase to utilize the advantageous scattered light suppression of the method. This can be done using a trigger-ready image intensifier (such as in reference [6]): the latter can be switched very fast and acts as a fast gate that is modulated during the comparatively long image-taking time of the conventional CCD or CMOS camera downstream from it. If the modulator FM, image intensifier, and spinning micro-lens disc SML are synchronized accordingly, two images can be recorded sequentially, the first with intact foci (both excitation beam halves in-phase, FIG. 4) and the second with "destroyed" foci (both excitation beam halves anti-phase, FIG. 4). If more than these two exemplary "model points" of the modulation period are scanned, the phase position can be reconstructed in the wide field, for example, from 3 or 4 camera images per period. Averaging over multiple periods can further improve signal quality.

Placing the FM in the pupil means that all partial beams are present in the pupil at a different angle depending on their position; each point fills the pupil completely, and because half the pupil is modulated by the FM, each spot is half phase modulated and superseded in the sample.

The FM may also be an EOM, but also an element as described in prior art reference [1], [2].

FIG. 5c) shows the scanning pattern of a spinning micro-lens disc in reduced form: all pixels 1 are illuminated at the same time, then all pixels 2, etc. A complete image is provided with one rotation of the disc. For in-phase demodulation of the image, the disc rotation must be phase-coupled such that all pixels 1, 2, 3, 4 . . . have the same phase position. The modulation ω must also be an integral multiple of the rotation frequency and pixel frequency of the disc. The frequency at which the intensifier is triggered on the other hand must be a multiple of the modulation frequency.

Specific Example

A typical spinning disc [3] can be operated at 125 rps or more, the (total number of micro-lenses/number of simultaneously illuminated lenses) ratio LB being 12, such that 12 images are scanned per revolution, which is an image rate of 1500 Hz. Assuming that 1000 lenses are scanned simultaneously and there are 500×500 camera pixels, there will be 250 pixel exposures per micro-lens and image, and at a 10 MHz modulation frequency of the half-beam modulator there will be 10 MHz/(1500 Hz*250)–26 modulation periods per pixel that can be scanned and integrated to obtain a measuring point for determining the phase position. An advantageous image rate of 375 Hz would then result for 4 phase points (as in FIG. 5b)).

As an alternative to the image intensifier camera, a CMOS/CCD camera with integrated lock-in pixels can be used, such as in [4] & [5]. These cameras are usually used for time-of-flight based range finding in combination with modulated illumination but can also be used for demodulation in an arrangement as in FIG. 5.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A microscope consisting essentially of at least one illuminating beam which is only partially phase-modulated along its cross section at a modulation frequency, a microscope objective for intensity-modulated focusing of the illuminating beam into a sample, a detection beam path, and at least one electro-optical modulator (EOM) used for partial phase modulation of the illumination beam at the modulation frequency.

2. The microscope according to claim 1, wherein a portion of the illumination beam runs via said electro-optical modulator or the electro-optical modulator is only partially located in the illumination beam.

3. The microscope according to claim 1, wherein halves of the illumination beam are subjected to different modulation by opposite-poled triggering of parts of one electro-optical modulator or by triggering several electro-optical modulators.

4. A microscope according to claim 1 further comprising acousto-optical modulators for splitting said illuminating beam into a plurality of partial beam paths, and optic elements provided for partial phase modulation of said illuminating beam, and actuating elements provided for setting a phase difference.

5. The microscope according to claim 2 wherein said portion of the illumination beam is half of said illumination beam.

6. A microscope consisting essentially of at least one illuminating beam which is only partially phase-modulated along its cross section at a modulation frequency, a microscope objective for intensity-modulated focusing of the illuminating beam into a sample, a detection beam path, wherein different beam sections or halves of the illumination beam are subjected to different modulation by anti-phase triggering of piezo elements.

7. A microscope comprising at least one illuminating beam which is partially phase-modulated with a modulation frequency along a cross section thereof, a microscope objective for intensity-modulated focusing of the illuminating beam into a sample, a detection beam path having at least one demodulator, and at least one electro-optical modulator (EOM) used for phase modulation of at least a portion of the illumination beam and at least one acousto-optical modulator (AOM) used for demodulation in the detection.

8. The microscope according to claim 7, wherein beam switching for demodulation is performed using at least one acousto-optical modulator (ACM).

9. A microscope according to claim 8 further comprising means for causing a change in the mode of operation of the detectors for demodulation.

10. A microscope comprising at least one illuminating beam which is partially phase-modulated with a modulation frequency along a cross section thereof, a microscope objective for intensity-modulated focusing of the illuminating beam into a sample, a detection beam path having at least one demodulator, and at least one electro-optical modulator (EOM) used for phase modulation of at least a portion of the illumination beam, a spinning micro-lens disc or multi-spot generation producing a foci distribution, said individual foci being subjected to an intensity modulation either by arranging a half-space phase mask in a pupil plane of the objective or by individually manipulating split or separate partial beams by means of the partial phase modulation of said partial beams with a modulation frequency along the cross section thereof, or by manipulating a beam by means of the partial phase modulation of said beam with a modulation frequency along the cross section thereof and subsequent subdivision of said beam into partial beams.

11. A method for microscopic detection of light from a sample consisting essentially of illuminating said sample by at least one illumination beam via a microscope objective for focusing, said illumination beam being only partially phase modulated along a cross section thereof, demodulation taking place in a detection beam path, transforming the phase modulation of the illumination in the sample into an intensity modulation or the detection is demodulated, and using at least one electro-optical modulator (EOM) for phase modulation of at least half the illumination beam.

12. The method according to claim 11, wherein a portion of the illumination beam runs via the EOM or the EOM is only partially located in the illumination beam.

13. The method according to claim 11, wherein different beam sections or halves of the illumination beam are subjected to different, preferably anti-phase, modulation by opposite-poled triggering of parts of one EOM or by triggering several EOMs.

14. A method for microscopic detection of light from a sample which is illuminated by at least one illumination beam via a microscope objective for focusing, said illumination beam being only partially phase modulated along a cross section thereof, comprising demodulation taking place in a detection beam path, transforming the phase modulation of the illumination in the sample into an intensity modulation or the detection is demodulated, and subjecting different beam sections or halves of the illumination beam to different, anti-phase, modulation by opposite-poled triggering of piezo elements.

15. A method for microscopic detection of light from a sample consisting essentially of illuminating said sample by at least one illumination beam via a microscope objective for focusing, said illumination beam being only partially phase modulated along a cross section thereof, wherein a demodulation takes place in a detection beam path, the phase modulation of the illumination in the sample being transformed into an intensity modulation or the detection is demodulated, wherein at least one acousto-optical modulator performs a splitting said illumination beam into a plurality of partial beam paths, and partially phase modulating said illumination beam by optic elements provided for said partial phase modulation, and setting a phase difference by actuating elements.

16. A method for microscopic detection of light from a sample which is illuminated by at least one illumination beam via a microscope objective for focusing, said illumination beam being partially phase modulated along a cross section thereof, wherein a demodulation takes place in a detection beam path, wherein the phase modulation of the illumination in the sample is transformed into an intensity modulation or the detection is demodulated, wherein at least one acousto-optical modulator (AOM) is used for demodulation in the detection.

17. The microscope according to claim 16, wherein beam switching for demodulation takes place using the AOM.

18. A method for microscopic detection of light of a sample which is illuminated by at least one illumination beam via a microscope objective for focusing, said method consisting essentially of only partially phase modulating said illumination beam along a cross section thereof, wherein a demodulation takes place in a detection beam path, said phase modulation of the illumination in the sample being transformed into an intensity modulation or the detection is demodulated, wherein a change in the mode of operation of the detectors for demodulation takes place.

19. A method for microscopic detection of light from a sample which is illuminated by at least one illumination beam via a microscope objective for focusing, said illumination beam being partially phase modulated along a cross section thereof, wherein a demodulation takes place in a detection beam path, wherein the phase modulation of the illumination in the sample is transformed into an intensity modulation or the detection is demodulated, wherein in the case of foci distribution, produced for example by a spinning micro-lens disc or multi-spot generation, the individual foci are subjected to an intensity modulation, either by arranging a half-space phase mask in a pupil plane of the objective or by individually manipulating each partial beam by means of the partial phase modulation of said partial beam with a modulation frequency along the cross section thereof or by manipulating a beam by means of the partial phase modulation of said beam with a modulation frequency along the cross section thereof and subsequent subdivision of said beam.

\* \* \* \* \*